UNITED STATES PATENT OFFICE.

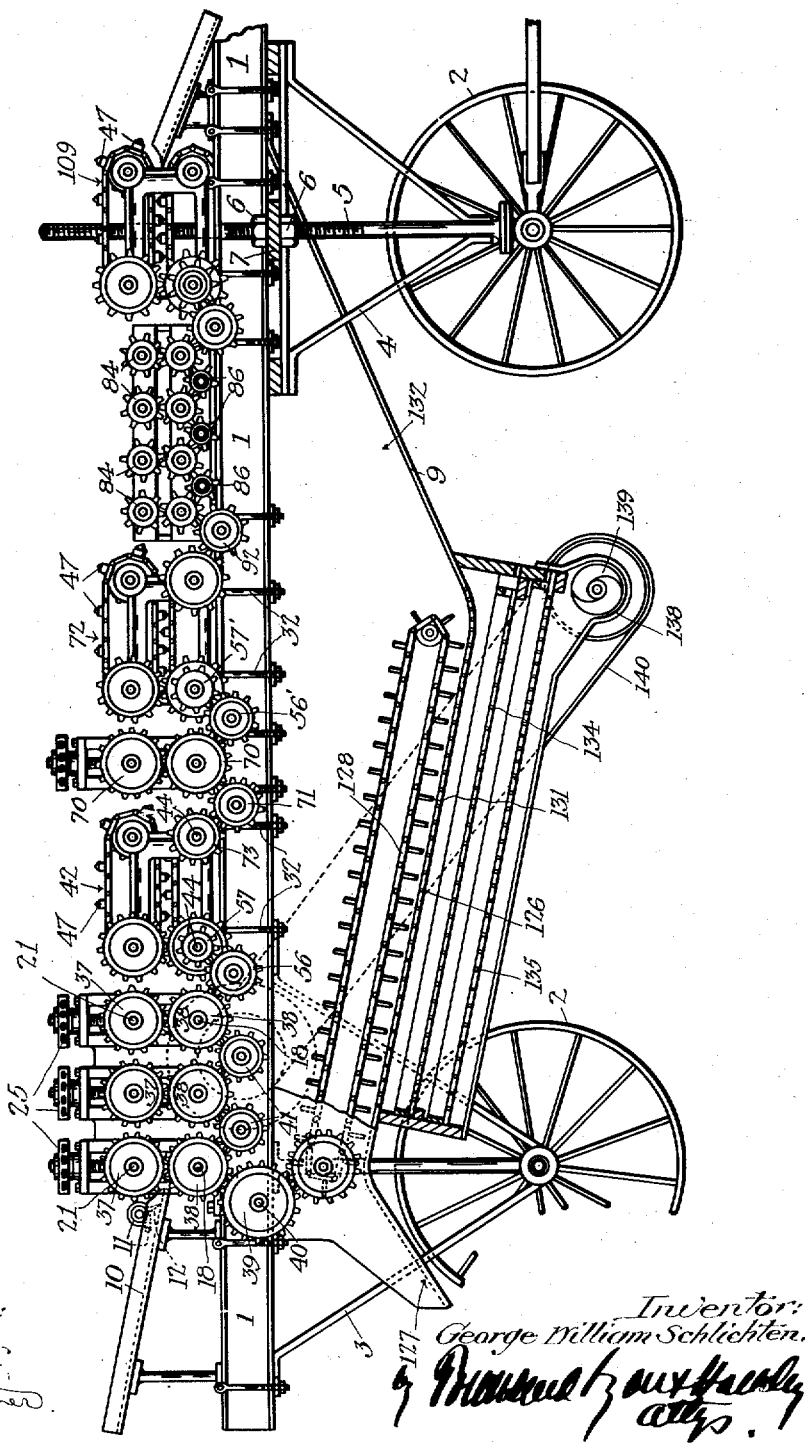

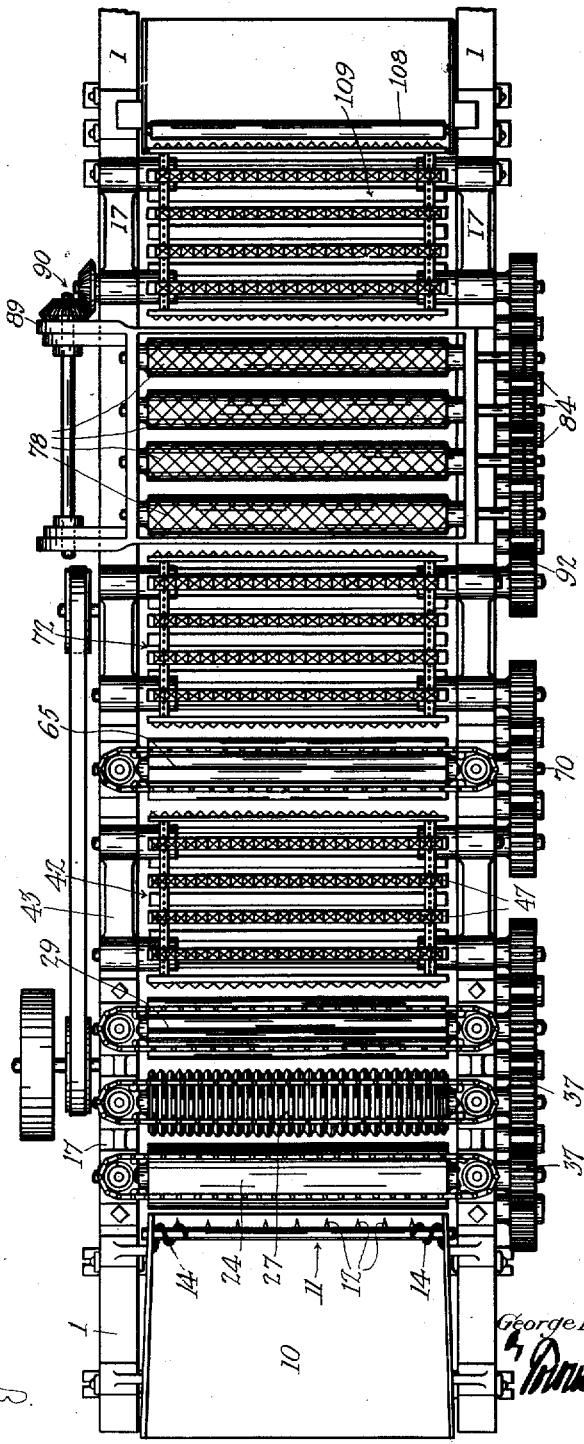

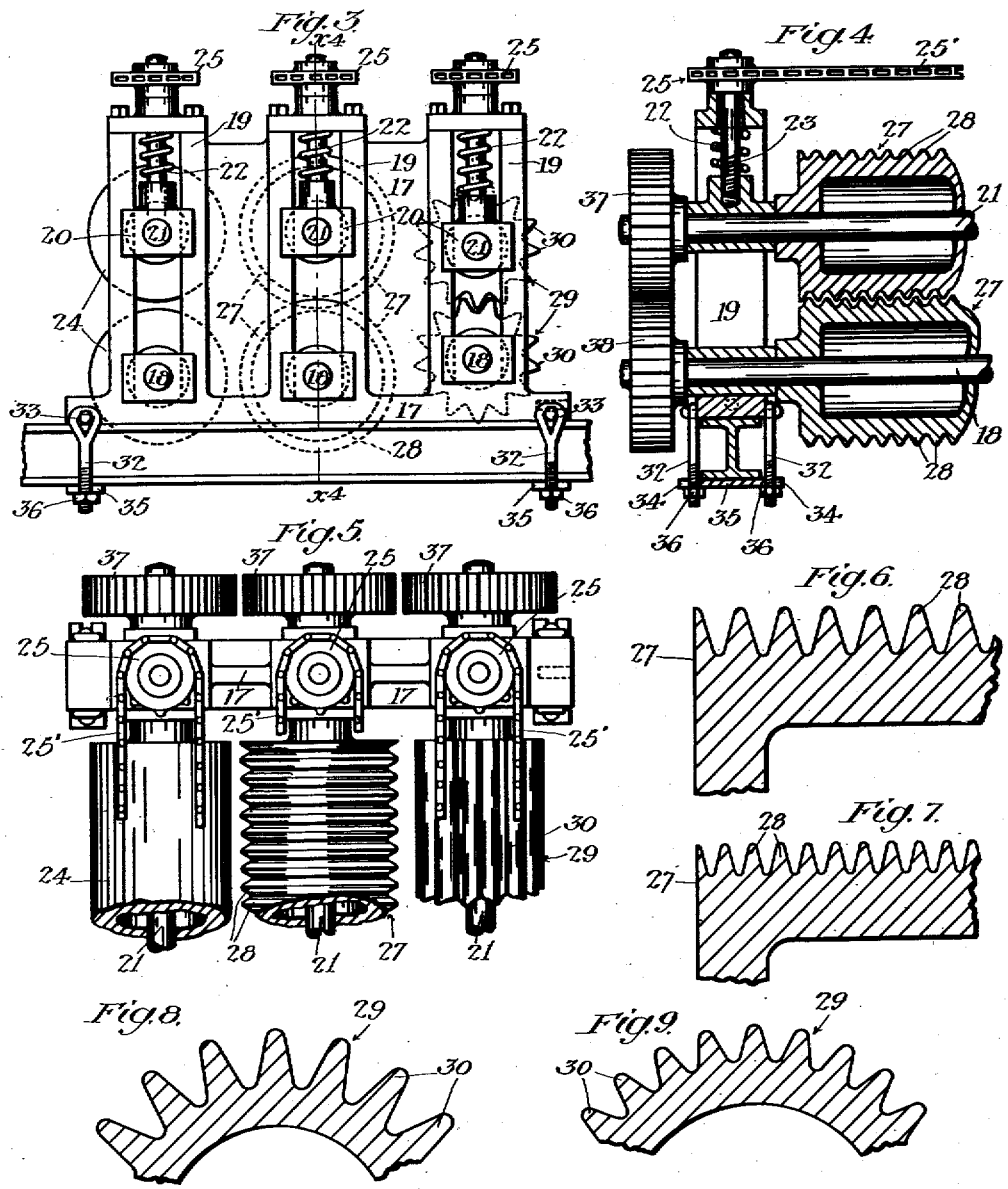

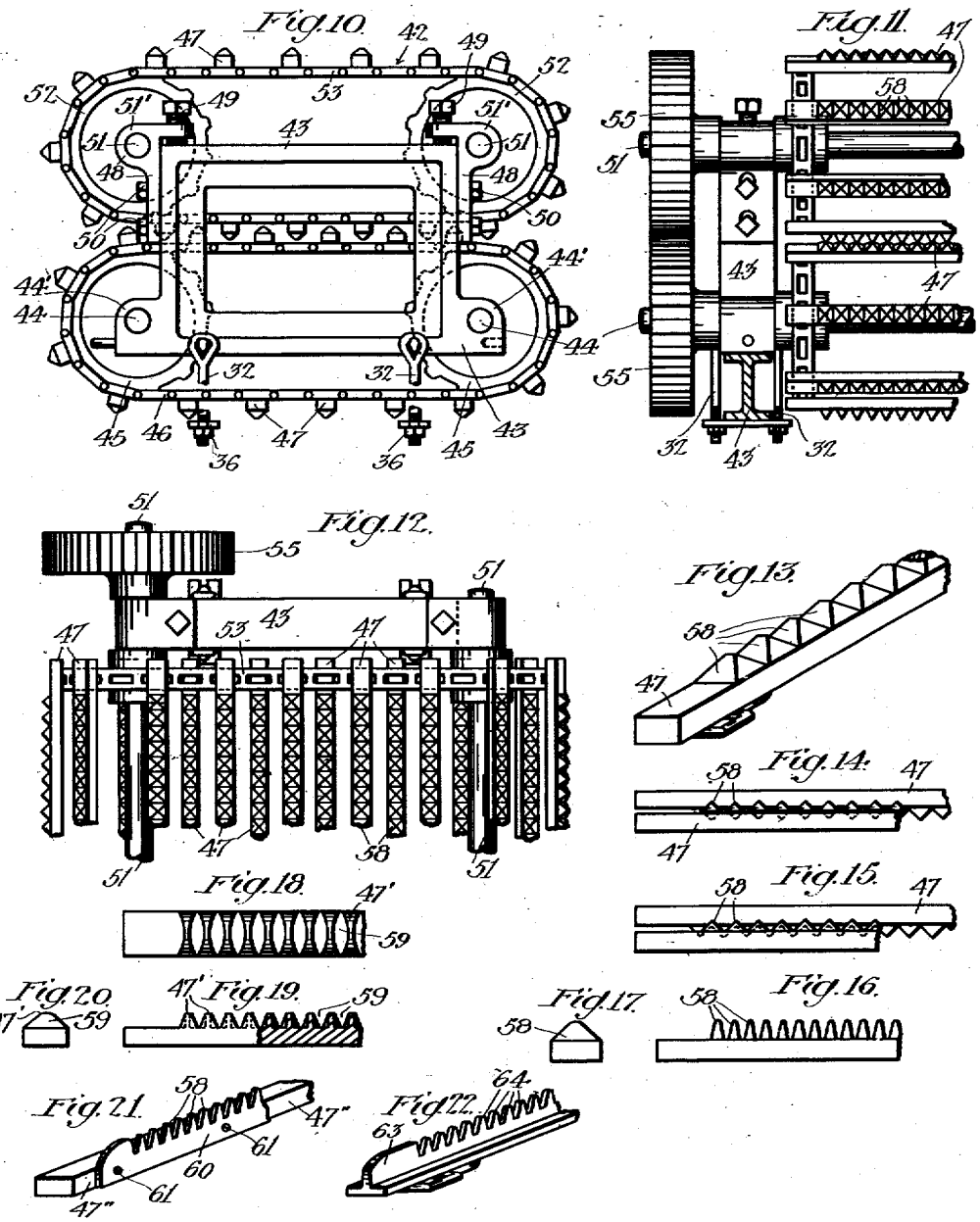

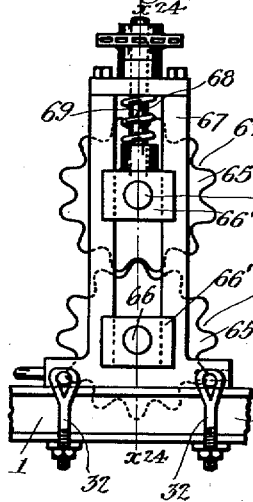
Fig. 23.
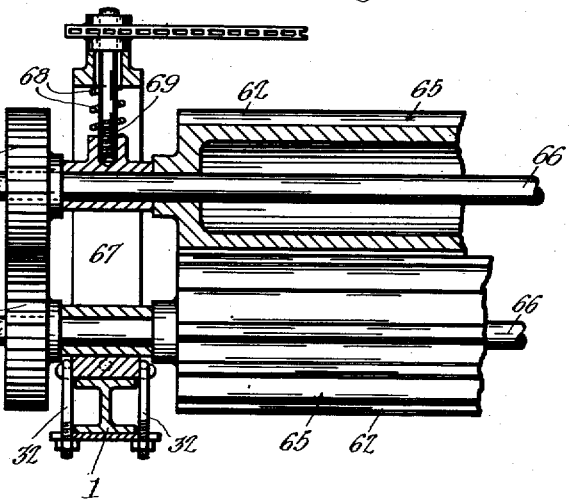
Fig. 24.
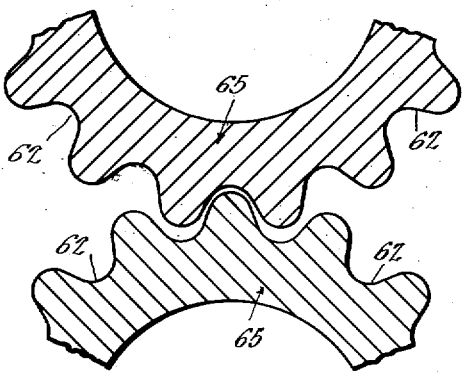
Fig. 25.
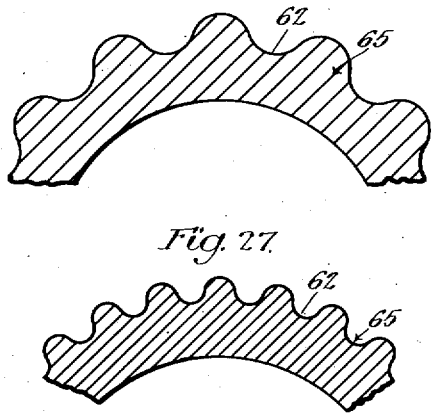
Fig. 26.
Fig. 27.

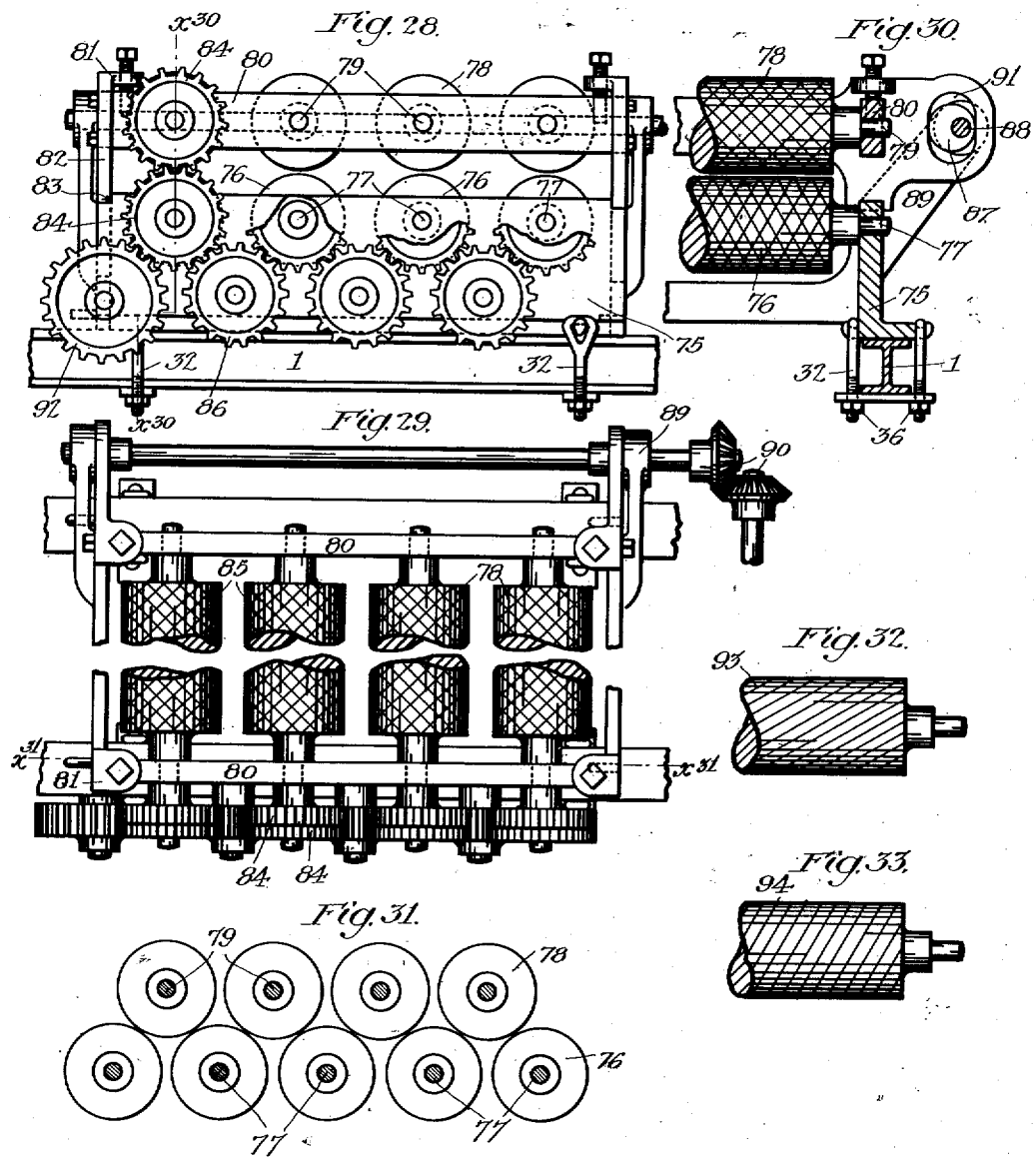

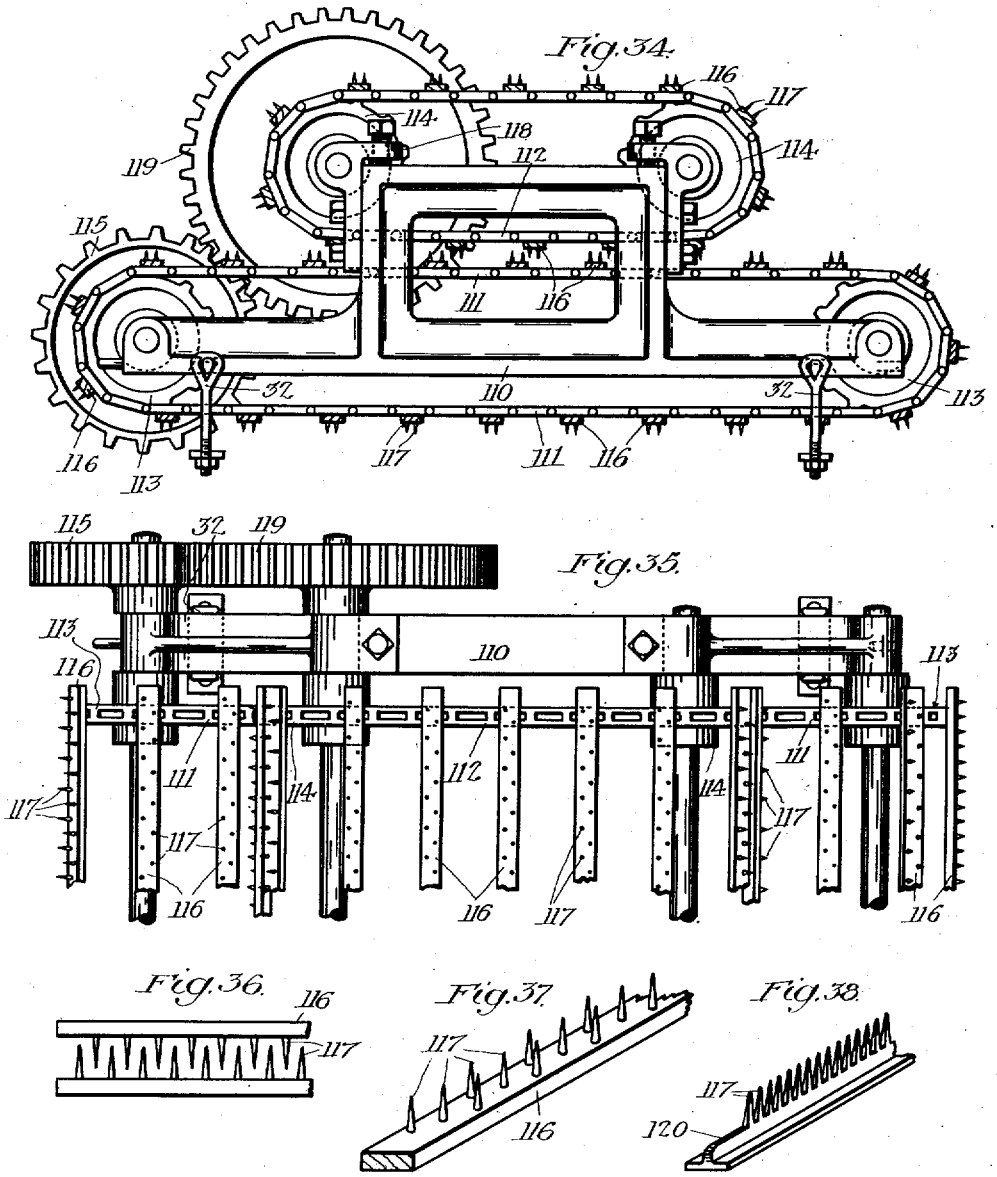

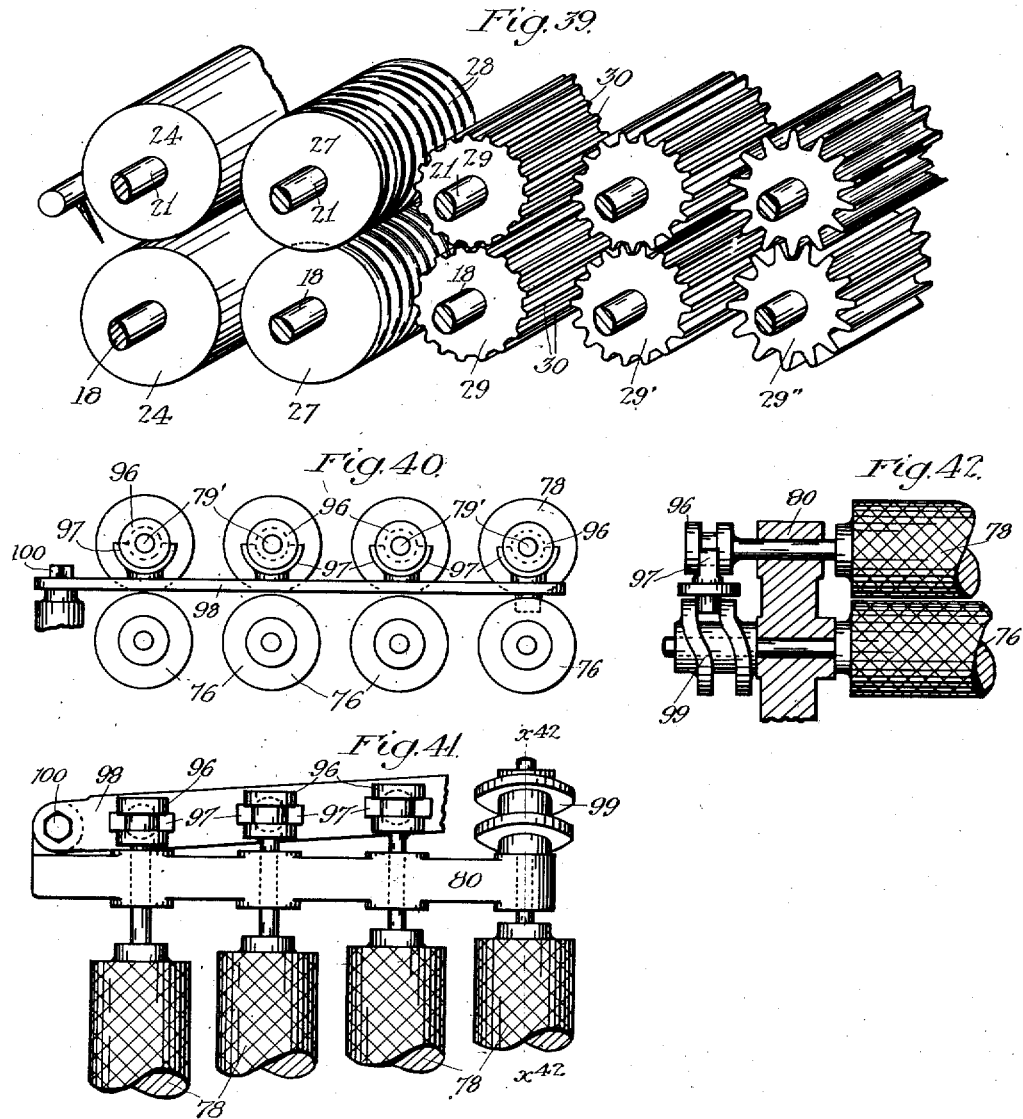

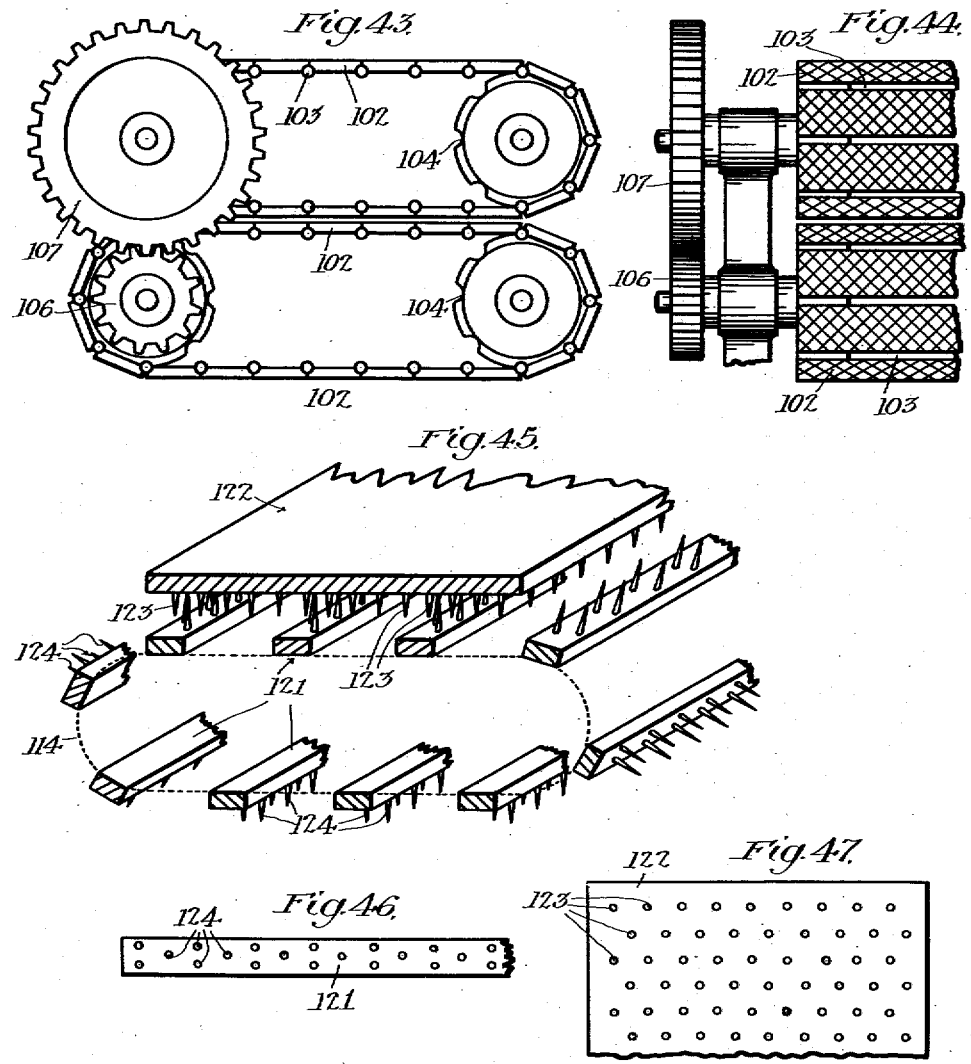

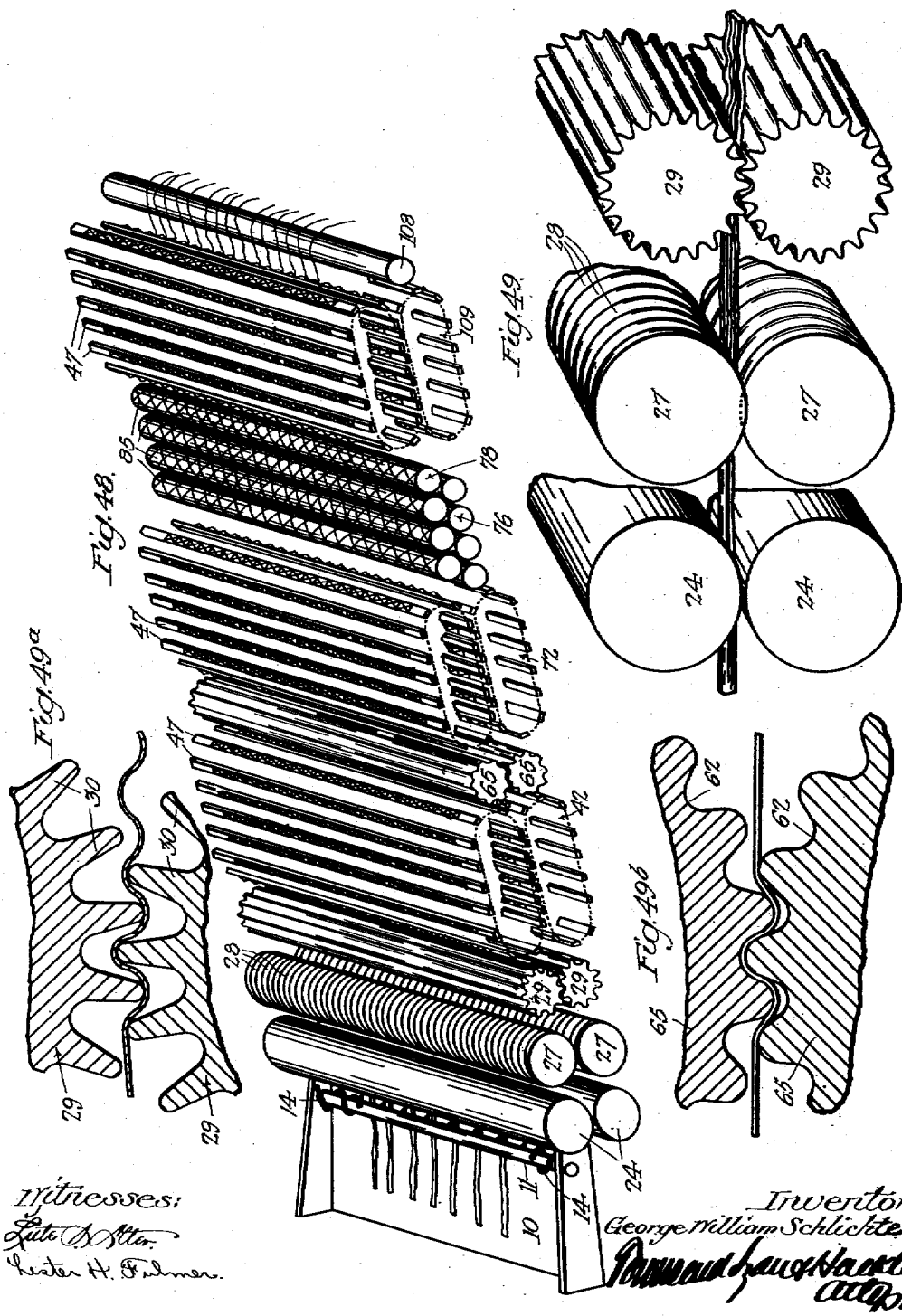

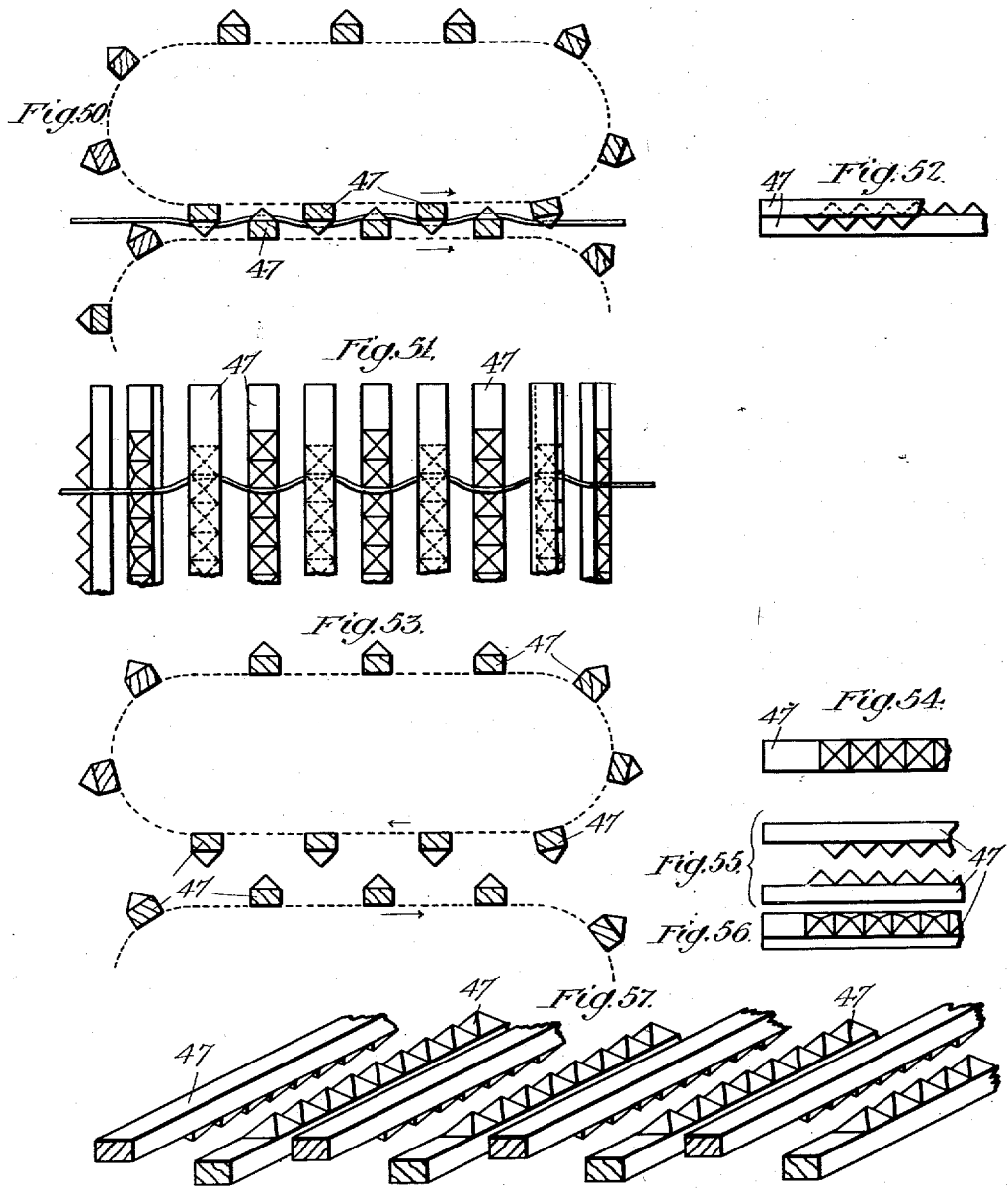

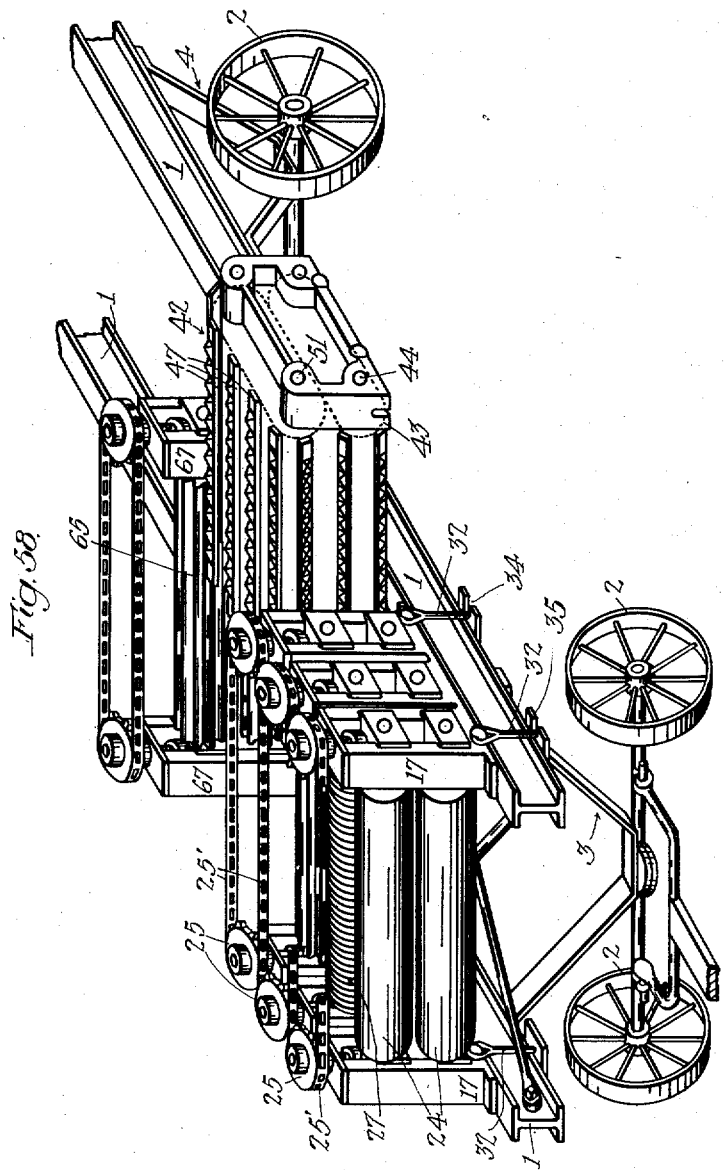

GEORGE WILLIAM SCHLICHTEN, OF LOS ANGELES, CALIFORNIA.

APPARATUS FOR TREATMENT OF FIBER-BEARING AND OTHER PLANTS.

1,021,269. Specification of Letters Patent. Patented Mar. 26, 1912.

Application filed July 11, 1910. Serial No. 571,484.

*To all whom it may concern:*

Be it known that I, GEORGE WILLIAM SCHLICHTEN, a citizen of the United States, residing at Los Angeles, in the county of Los Angeles and State of California, have invented a new and useful Apparatus for Treatment of Fiber-Bearing and other Plants, of which the following is a specification.

This invention relates to the operation whereby the stalks, leaves or other parts of fiber bearing plants, in particular such as ramie, flax, hemp, jute, sesbania and the like, are manipulated, and the fiber or the seed thereof is separated from the woody, fleshy and refuse material contained in the stalks, etc.

The main object of the invention is to separate and clean the fiber from the fiber bearing stalks or plants without entangling, breaking, tearing or injuring the fiber or making the same towey.

Another object of the invention is to provide for extracting and saving the seed of flax, sesbania and similar plants without injury thereto.

Another object of the invention is to provide for simultaneous separation from the fiber bearing stalks or plants of the fiber and the seed without injury to either of them.

Another object of the invention is to provide for treatment of tangled or broken stalks or plants in such a manner that the fiber thereof is recovered in commercially valuable form.

Another object of the invention is to provide for preparing the fibers in practically perfect condition for carding or combing for spinning and the seed in clean condition for crushing or grinding.

A further object of the invention is to provide an apparatus for the above stated purpose which will be readily changeable or adjustable to adapt it to different conditions of practice. In this connection the invention provides a series of elements for performing successive operations upon the fiber-containing stalks or leaves, such as crushing, splitting, breaking, scutching, stripping, combing, drawing, rubbing, cleaning and hackling, and the operative elements for each of these operations may be duplicated or multiplied or may be provided in forms giving a stronger or weaker action on the fiber being treated, or some of them may be omitted, according to the requirements of the fiber or of the condition of the fiber.

Other objects and advantages of the invention will appear hereinafter.

My process of treating the fiber-containing stalks consists essentially in first crushing the stalks by running them longitudinally between compressing surfaces so as to flatten the stalks and partially loosen the fiber from the interior portion of the stalks. Second, of partially splitting the crushed stalks so as to divide and spread the skin or outer portions, containing the fiber, but without breaking the interior or woody portions of the stalks. Third, subjecting the stalks to a longitudinal bending action to break the interior woody portion into sections. Fourth, subjecting the stalks to a scutching operation in which it is subjected to a longitudinal stripping effect by means of applying frictional pressure thereto and is also subjected to a shaking and beating operation, and to combing and drawing operations to eliminate the broken wood or hurds. Fifth, running the fiber longitudinally through means exerting flexion, pressure and friction on the fiber to soften the same and release the residue of the woody matter and bark as well as gum from the fiber. Seventh, running the fiber longitudinally through a second scutching means wherein it is subjected again to the stripping, beating, combing, drawing, rubbing and cleaning operations to dislodge the loosened, woody matter, etc., from the fiber.

The process, being intended especially for simultaneous recovery of the fiber and of the seeds, provides for separation and collection of the seeds during the aforesaid operations, the seeds being loosened and dislodged from the stalks by the crushing, splitting, breaking, and scutching operations before it reaches the softening operation above described and being collected as it is thus separated and subjected to cleaning operations.

In application to special fibers, some of the above steps may be omitted and other steps substituted therefor and in case of other fibers or fibers in certain conditions, supplementary steps may be necessary, as hereinafter described.

The accompanying drawings illustrate the invention, and referring thereto: Figure 1 is a side elevation of the machine, showing the seed collecting and cleaning means in section. Fig. 2 is a plan of the machine. Fig. 3 is a side elevation of the first section of the machine comprising the crushing, splitting and breaking devices. Fig. 4 is a transverse section on the line $x^4$—$x^4$ in Fig. 3. Fig. 5 is a plan of the apparatus shown in Fig. 3. Figs. 6 and 7 are longitudinal sections illustrating the variation in size of the ribs on the splitting roll. Figs. 8 and 9 are fragmentary transverse sections of the breaking roll illustrating the variation in size of the corrugations therein. Fig. 10 is a side elevation, partly broken away, of the scutching mechanism. Fig. 11 is a partial end elevation thereof, showing one side bar of the supporting frame in section. Fig. 12 is a partial plan view of the scutching mechanism. Fig. 13 is a perspective of one of the scutching bars. Fig. 14 is a side elevation of two of said bars in working relation. Fig. 15 is a similar view to Fig. 14, showing the preferred arrangement of the teeth on the bars. Fig. 16 is a side elevation of a modified form of the scutching bar. Fig. 17 is an end elevation thereof. Fig. 18 is a plan of a modified form of the scutching bar. Fig. 19 is a longitudinal section, partly in elevation, thereof. Fig. 20 is an end view of the scutching bar shown in Figs. 18 and 19. Figs. 21 and 22 are perspectives showing further modifications of the scutching bar. Fig. 23 is an end elevation of a softening device. Fig. 24 is a section on the line $x^{24}$—$x^{24}$ in Fig. 23. Fig. 25 is a fragmentary section, showing the manner of intermeshing of the corrugations in the softening rollers. Figs. 26 and 27 are partial sections, showing the variation in the size of the corrugations in the softening rollers. Fig. 28 is an end elevation of supplementary cleaning mechanism for rubbing the residue, adherent bark and woody matter from the fiber, in cases where such supplementary action is required. Fig. 29 is a plan thereof. Fig. 30 is a partial section on line $x^{30}$—$x^{30}$ in Fig. 28. Fig. 31 is a section on line $x^{31}$—$x^{31}$ in Fig. 29. Figs. 32 and 33 are side elevations of rolls used in said supplementary mechanism showing variations in the surfacing thereof. Fig. 34 is an end elevation of a hackling mechanism required in the operation, as hereinafter described. Fig. 35 is a plan thereof. Fig. 36 is a side elevation of a pair of hackling elements, showing their coöperation. Fig. 37 is a perspective of one of said elements. Fig. 38 is a perspective of a modified form thereof. Fig. 39 is a diagrammatic perspective, showing an amplification of the first section of the machine, wherein a series of breaking rollers are provided having graded corrugations adapted to act with successively stronger effect on the stalk or fiber containing material. Fig. 40 is an end elevation, showing a different form of the supplementary cleaning means which may be substituted for the form shown in Fig. 28. Fig. 41 is a partial plan view thereof. Fig. 42 is a section on the line $x^{42}$—$x^{42}$ in Fig. 41. Fig. 43 is an end view of another form of said supplementary cleaning means which may be substituted for the form shown in Fig. 28. Fig. 44 is a side elevation thereof. Fig. 45 is a perspective of a modified form of hackling mechanism which may be substituted for that shown in Fig. 34. Fig. 46 is a plan of one of the hackling bars. Fig. 47 is an inverted plan of the fixed hackling frame or card shown in Fig. 45. Fig. 48 is a general diagrammatic perspective of the several elements in the apparatus to illustrate the manner in which the process is carried on therein. Fig. 49 is a diagrammatic perspective illustrating the operation of the first section including the crushing, splitting and breaking rollers. Fig. 49$^a$ is a sectional view showing the operation of the breaking rolls. Fig. 49$^b$ is a sectional view illustrating the operation of the softening rolls. Fig. 50 is a diagrammatic section illustrating the operation of the scutching means. Fig. 51 is a plan of the lower scutching member showing the course of the fiber therethrough. Fig. 52 is a side elevation of the coöperating scutching members. Fig. 53 is a digrammatic view illustrating a modified arrangement and operation of the scutching means. Fig. 54 is a plan of one of the scutching bars therefor. Fig. 55 is a side elevation of a pair of coöperating scutching members. Fig. 56 is a side elevation of one of the scutching bars of the form shown in Fig. 53. Fig. 57 is a diagrammatic perspective of the scutching elements. Fig. 58 is a perspective illustrating the manner in which the parts may be interchangeably replaced, removed or adjusted in the supporting frame.

The apparatus comprises a series or plurality of sections or separable devices, all mounted on a frame or support, indicated at 1. For convenience in transportation and particularly in order to render the apparatus available for treating the fiber in the field without the necessity of hauling the same, I prefer to mount the support or frame 1 on means such as trucks or wheels 2, said trucks or wheels being, for example, journaled in frames 3, 4, the forward frame 3 being directly connected to the main frame 1 and the rear frame 4, preferably, being provided with means for adjustably supporting the rear end of the main frame 1, so that the frame and the apparatus carried thereby may be tilted upwardly and rearwardly for the purpose hereinafter set forth. Said adjusting means may consist of a screw 5 and nuts 6 engaging therewith and with a cross bar 7 of the main frame 1.

The several sections of the machine are supported removably on the main frame 1, said main frame consisting, for example, of two longitudinal bars, preferably channel irons, and each section of the machine being provided with means for clamping it in place on said channel irons in such manner that each section may be adjusted longitudinally on the frame or may be removed or placed in position if desired.

At one end of the main frame there is provided a feed table 10 which may slope forwardly and downwardly toward the other end of the machine to aid in carrying the material into the first section of the apparatus. A rake 11 may be located at the lower end of this feed table to straighten the stalks as they pass into the machine and to prevent overfeeding, said rake comprising a cross bar provided with a series of fingers 12 extending forwardly and downwardly into proximity with the table and provided with spring means 14 tending to hold said fingers in such proximity, allowing them to yield when feeding broken up tangled stalks.

The first section of the apparatus comprising the crushing, splitting and breaking devices may be mounted in a single frame 17 detachably supported on the main frame 1 and provided with bearings for the shafts 18 of the lower rolls of the respective devices and with pedestals 19 for journal blocks 20 in which the shafts 21 of the upper rolls of said devices are journaled. Springs 22 may be provided for giving elastic pressure on said journal blocks to control the pressure of the said devices and screw means 23 may be provided for limiting the downward movement of the upper rolls and thereby controlling the amount of separation between the rolls of each device. Screws 23 for opposite ends of the rolls may be connected by sprocket wheels 25 and chains 25' to adjust both ends of the rolls in unison.

The crushing rolls, indicated at 24, are the first in the series and are preferably smooth, cylindrical rollers adapted to crush and flatten out the stalks and to partially loosen the fibers from the rest of the stalk, but without splitting or breaking the stalk. Said crushing rolls 24 also serve as feeding rolls. This operation is controlled by the vertical adjustment of the upper roller by the means stated. Splitting rolls 27 which are the second set of rolls in the apparatus are provided with circumferential ribs 28 and are so adjusted by the adjusting means above described that said ribs intermesh (see Fig. 4) sufficiently to split the outer portion of the stalk, by which the fiber is loosened from same. Said ribs may be of variant size, as shown in Figs. 6 and 7, to adapt the device to different kinds of fiber plants with large and small stalks.

The breaking rolls 29 which are arranged next to the splitting rolls are provided with longitudinal corrugations or ribs 30 which intermesh, as shown in Figs. 3 and 49ª, the adjustment by means of the above described adjusting devices being such as to cause the corrugations to intermesh sufficiently to break the inner or woody portion of the stalks, already rendered limber by the precedent crushing and splitting operations, but not to rub or squeeze the same. The corrugations in rolls 29 are adapted, as regards spacing and depth, to the fiber being treated, rolls with corrugations of variant size being provided, as shown in Figs. 8 and 9, and the rolls being replaced or substituted according to requirements of the fiber stalks. In some cases a plurality of sets or pairs of breaking rolls may be provided as shown in Fig. 39, where 29' and 29'' show rolls following after the rolls 29 with successively coarser or deeper corrugations, so as to produce an increasing or successive breaking effect on the stalks, this gradual operation being necessary, when the fiber will not stand the stronger action which would be required for breaking at a single operation, such sets being attached independently and forming a part of the initial apparatus which comprises the crushing, splitting and breaking devices and which in one form or another is required for operation with any and all kinds of fiber. The means for detachably supporting the frame of this section of the apparatus on the main frame 1 may be of any suitable construction consisting, for example, of eye bolts 32 engaging over hooks 33 on the frame 17 of the device and engaging in slots 34 in a plate 35 extending under the main frame bar 1 and provided with nuts 36 whereby they may be clamped into position or may be detached for removal or longitudinal adjustment of the device or section of the apparatus as a whole.

The several sets or rollers above described may be driven by any suitable means, so as to rotate in the same direction at the proper speed. Thus, as shown in Fig. 1, gears 37 may be provided on the upper rollers and gears 38 on the lower rollers engaging the upper gears 37, a driving gear 39 being provided on a driving shaft 40 and engaging one of the lower gears 38 and idlers 41 being provided between the respective lower gears, so that all of said gears are driven from the said driving shaft.

The element or section of the machine following the devices above described is the scutching means 42, see Figs. 10 to 12, mounted in a frame 43 resting on the side bars 1 and clamped thereto by a releasable clamp means, as above described for the first section of the apparatus. Said frame is provided with bearings 44' for shafts 44, each of said shafts carrying a pair of sprocket wheels 45 for supporting and operating the lower carrier consisting of chains 46 engaging said sprocket wheels and bars 47 extending transversely between said chains. The frame 43 is provided with brackets 48 adjustably mounted thereon by set screws 49 and clamping means 50, said bracket being formed with bearings 51' for shafts 51 for sprocket wheels 52 carrying chains 53 for an upper carrier provided with cross bars 47, extending between said chains.

The shafts 44, 51 for the upper and lower carriers are driven by means of gears 55 thereon, said gears 55 on the said shafts at one end, say the end nearest the preceding mechanism, are preferably driven from said mechanism by means of an idler gear 56 engaging with the last gear 38 in the said preceding mechanism and with a gear 57 on the said shaft 44, the proportion of the said gears being preferably such that the said carrier means are driven at a considerably greater linear velocity than the linear or circumferential velocity of the rolls in the preceding mechanism. The transverse bars 47 on the carrier members of the scutching means are provided with projections adapted to spread or separate and to engage the fiber to scutch, draw, comb and strip the same, said projections consisting, for example, of pyramidal or wedge-shaped teeth on the bars 47, as indicated at 58 in Fig. 13, or, as shown in Figs. 16 and 17, the said projections may be wedge-shaped, said teeth being spaced according to requirements being, for example, large and widely spaced apart, as shown in Fig. 13, or close together, as shown in Fig. 16, or said teeth may be formed by rounding the top of the bar, as indicated at 47' in Fig. 18, and cutting notches 59 therein, or as shown in Fig. 21, the wedge-shaped teeth may be formed in a metal plate 60 removably attached by fastening means 61 to the bar indicated at 47''. Or as shown in Fig. 22, the said bar and teeth may be formed integrally in the shape of T-bar 63 having teeth 64 formed in its upper flange.

In each of the above cases the projections on the bars are wedge shaped or upwardly tapering, forming V-shaped notches in the bars, between the teeth, these notches receiving the fiber and stripping off the woody matter while allowing the fiber to pass. It will be understood that the term "V-shaped notches" as herein used includes any form of notches adapted to act in the same manner.

The teeth or scutching projections on the lower carrier member face upwardly and the teeth or scutching projections on the upper carrier member face downwardly when in action on the fiber and it is preferred to so adjust the said carrier members that said teeth intermesh or extend between one another in the adjacent portions of the carrier members, said carrier members being driven at the same speed, so that the scutching bars with the teeth thereon form a series of alternating higher and lower surfaces, the high surfaces being directed upwardly and the lower surfaces being directed downwardly and the fiber being drawn and cleaned between the same in a sinuous or zig-zag course, as hereinafter described. In thus extending between the upper and lower scutching bars, the fiber tends to lie in the depressions between the teeth in said bars and I prefer to arrange the said teeth as shown in Fig. 15, so that in passing from the depression in the lower bar to the depression in the next bar in the upper series and so on, the fiber will follow a zig-zag course, and the teeth on the lower bars being opposite the line of the depressions in the upper bar. Or as shown in Fig. 14, the depressions on one bar may be in line with the depressions on the other. The chains of the scutching mechanism are loosely mounted so as to vibrate or shake vertically in the operation of the machine, thereby subjecting the fiber to a scutching or beating operation.

The next mechanism in order is the softening means, Figs. 23 and 24, comprising rolls 65 mounted in bearings 66' in the pedestal frame 67 supported by releasable clamping means 32, as above described, on the main frame bars 1 and provided with elastic pressure means 68 and adjusting screw 69 for adjusting the height thereof. Said rolls 65 are provided with longitudinal corrugations 62 and said corrugations in this case are so shaped that when the rolls are properly adjusted, said corrugations will intermesh more closely than the corrugations in the breaking rolls and in such manner that when the fiber passes between them it will be subjected to friction and a squeezing or rubbing action and thereby softening the fiber as well as the residue of bark, etc., which adheres to the fiber. The said softening rolls are driven by gears 70 on shafts 66 for the upper and lower rolls. An idler gear 71 is mounted in suitable bearings on the frame 1 and engaging with a gear wheel 73 on a shaft 44 for the preceding mechanism. These softening rolls move with higher peripheral velocity than the crushing, splitting and breaking rolls, so as to maintain the fibers taut, but at less velocity than the scutching means.

The next mechanism in order is the second scutching mechanism 72 comprising upper and lower carrier members, transverse scutching bars thereon and operating gears, said mechanism being similar to the first scutching mechanism, above described, except that the projections or teeth on the scutching bars are closer together, so as to produce a more thorough scutching, stripping, drawing, spreading and combing action. This second scutching mechanism is driven from the preceding mechanism by means of an idler 56 engaging with a gear 70 of said preceding mechanism and with a gear 57 of said scutching mechanism, generally in such manner that the second scutching mechanism is driven at higher linear velocity than the first scutching mechanism. In some cases, however, it is of advantage to drive the first scutching device at a higher speed than the second, or the speed of any of the scutching devices can be changed or regulated as best suited to the requirements.

For some purposes, the mechanism so far described will suffice for treatment of the fiber, but in other cases supplementary mechanism will be required comprising rubbing devices and hackling devices, either or both of which may be used according to circumstances.

The rubbing devices, see Figs. 28 to 31, comprise a series of rollers mounted on a frame 75 detachably supported on the supporting frame 1, as above described, for the preceding mechanisms, a plurality of lower rolls 76 having their shafts 77 journaled in said frame 75 and a plurality of upper rolls 78 having their shafts 79 journaled in frame bars 80 adjustably supported by means 81 providing for vertical adjustment on cross bars 82 movable in guides 83 transversely of the frame 75, so that the upper rollers may be given a vibratory motion longitudinally of their axis of rotation. Rolls 76, 78 are driven by gears 84 on the shaft, idlers 86 and a gear 92 driven by the last gear of the preceding mechanism. The rollers 76 and 78 are roughened as by means of grooving or knurling, indicated at 85, so as to present a surface adapted to frictionally engage the fiber and rub the same in the aforesaid vibratory movement of the rolls. Said vibratory movement may be produced by any suitable means, for example, by eccentrics 87 on a shaft 88 mounted in brackets 89 and driven by driving gears 90, said eccentrics working in slots 91 in the cross bars 82, so that the rotation of the same operates the said cross bars and the upper rolls carried thereby to and fro endwise over the lower rollers. In place of the knurling of these rubbing rollers they may be provided with either oblique or spiral grooves, as indicated at 93 in Fig. 32 and 94 in Fig. 33.

In place of the operating mechanism for imparting the vibratory movement to the rollers any other suitable means may be provided therefor, for example, the means shown in Figs. 40 to 42. The shafts 79' of said rolls being in this case mounted to slide longitudinally in the upper frame bars 80 and being provided with necks 96 engaged by lugs 97 on an operating bar 98, said operating bar being reciprocated, for example, by means of eccentric 99 driven by any suitable means and engaging one end of the bar, the other end of said bar being pivoted as at 100, or, if desired, the said bar may be operated by an eccentric at each end in the manner shown in Fig. 29.

In place of the cylindrical rubbing rolls above described, rubbing plates may be provided, as shown in Fig. 43, where 102 designates the plates jointed together by pivotal connections 103, so as to form an endless chain running around sprocket rollers 104 which are mounted and operated as above described for the rubbing rolls 76 and 78. In this case the upper carrier is shown as driven by means of gearing 106, 107, in such manner as to move at one-half the speed of the lower carrier.

The rubbing mechanism above described may be followed by a third scutching mechanism 109, similar to the second scutching mechanism, but driven at higher velocity and with finer teeth. This supplementary scutching mechanism may be succeeded, or in some cases, replaced by the hackling mechanism now to be described, or may be followed by an idler 108.

The hackling mechanism is mounted in a frame 110 adjustably supported on the main frame bars 1, as above described, and comprises lower and upper members provided with projections adapted to hackle the fiber. In the form shown in Figs. 34 and 35, both of said members are movable in the same direction, consisting of chains 111, 112 mounted on sprocket wheels 113, 114 and provided with cross bars 116 secured thereto, said cross bars being provided with pins or teeth 117 and the upper carrier being supported by suitable adjusting means 118, so that the teeth on the lower run thereof extend downwardly between the paths of movement of the upwardly extending pins 117 which extend upwardly from the cross bars 116 on the lower carrier. These pins may consist of metallic pointed studs inserted in wooden or metal cross bars, as indicated in Figs. 36 and 37, or as shown in Fig. 38, they may consist of integral projections on a metallic cross bar 120.

In the form shown in Fig. 34, the upper carrier is geared to move in the same direction as the lower carrier, the lower carrier moving forwardly in the direction of movement of the fiber with a speed in excess of that of the preceding mechanisms and the operative portion of the upper carrier moving in the direction of movement of the fiber, at, say, at one-half the speed of the lower carrier, being driven by idler 115 and gears 119 from the preceding mechanism.

In place of a movable upper hackling member the same may be fixed, as shown in Fig. 45, the lower hackling member, indicated at 121, being substantially the same construction as above described for the lower hackling member in Fig. 34 and the upper hackling member comprising a plate 122 mounted in fixed position on the frame by any suitable means and provided with downwardly extending pins 123 adapted to coöperate with the pins 124 of the lower hackling member.

It will be noted that each of the given mechanisms are driven by the preceding mechanism, for example, by one or more idler gears engaging with the last gear element of the preceding member and with the first gear element of the succeeding member, so that when the parts are removed or replaced they are brought immediately into driving relation with the adjoining parts.

As indicated in Fig. 58, any one of the elements or devices in the apparatus can be moved or slid bodily along the supporting frame 1, so as to bring it to proper position for operation, or can be removed bodily therefrom, the scutching device being shown in process of removal. Or, if desired, it can be lifted bodily off the frame and the remaining members slid up so as to close the gap and form a continuous machine. Moreover, the rolls in the various devices may be interchanged with rolls of other dimensions of operative corrugations, etc., as above described, the top plates of the pedestals for the journal blocks of said rolls being removably attached. When the devices are in proper position they may be locked together by pins 125 engaging with holes 125' in adjoining frames of said devices, or other suitable means.

The seed recovery means 9 consists of a case, hopper or chamber extending beneath the frame 1 and inclosed in such manner as to receive and collect all of the seeds and refuse that are loosened and separated from the fiber. Said member 9 may consist of a plate extending forwardly and downwardly from the rear end of the machine and provided at its forward portion with a perforated portion 126 forming a screen through which the seed falls and with a discharge spout or delivery outlet 127 at its forward end to carry off the hurds or waste matter. A scraping device consisting, for example, of a chain 128 mounted on sprockets 129 driven in any suitable manner as by gear 130 engaging with the gear 39, aforesaid, said chain carrying flights or blades 131 serves to carry the material deposited on the member 9 forwardly and upwardly toward said discharge spout 127 and scraping the said material over the surface of the screen 126. Suitable closure means may be provided at each side of the seed receiving means, as indicated at 132, to retain the material thereon. Supplementary screens 134, 135 may be provided in a box 136 beneath the screen 126 to separate the chaff from the seeds, the chaff passing out of openings 137 and the seeds passing to a well 138 whence a suitable conveyer, such as a screw 139, discharges them to any suitable receptacle, said conveyer being driven by means, such as belt 140.

The process is carried out in the above described apparatus, as follows, special reference being had to Fig. 48 showing, in a diagrammatic manner, the assemblage of the series of devices for operating successively on the fiber. The fiber stalks are passed from the feeding table 10 between the pair of smooth rollers, said stalks passing between the fingers of the rake device 11, so that they are straightened as they pass between the rolls 27 and said rolls serving to crush and flatten the stalks and also to feed them forwardly into the apparatus. In this crushing operation the outer portions or skin of the stalks are subjected to a spreading action whereby the fibers are partially loosened. From these rolls the fiber stalks pass to the splitting rolls 27, whose circumferential ribs 28 engage with the surfaces of the stalks in such manner as to split the same, by which means the fiber is more thoroughly loosened from the stalk. The stalks then pass between the breaking rolls 29, the corrugations of said rolls being spaced as indicated in Fig. 49$^a$, so as to bend the stalks, but not to pinch or squeeze them between the surfaces, the corrugations of the lower roll intermeshing with those of the upper roll, but being out of contact therewith and spaced therefrom a distance which at all parts is greater than the thickness of the stalk. This operation bends the stalks longitudinally in such manner as to break the interior or woody portions of the stalks into small pieces and also break up the bark more or less, but without any rubbing action. The fiber comes from these breaking rolls with the woody matter loosened and broken, but entangled with the fiber and the bark somewhat loosened, but adhering to the fiber. It will be noted that the bending of the stalks in passing between the breaking rolls exerts a longitudinal drawing action as it requires a greater length of stalks for a given longitudinal extension when it is so bent, and to compensate for this, the said breaking rolls are preferably arranged to run at a lower peripheral speed than either of the preceding sets of rolls, for example, by making the said breaking rolls smaller, as shown, or by suitable gearing. From the breaking rolls, the fiber passes to the scutching means 42, said scutching means being driven at a linear velocity which is considerably higher than that of the preceding mechanisms and tending to draw the fiber forwardly through its upper and lower members and at the same time, by engagement of the teeth or projections 58 on the said upper and lower members with the fiber to cause said teeth to scrape or strip the fibers, pulling the adherent material, especially the wood or hurds, therefrom, the said scutcher thus producing drawing, combing and stripping actions on the fiber. Moreover, the chains 46, 53 of the carrier members being somewhat loose, the driving motion thereof produces considerable vertical vibration or flapping of said members, whereby the slats and projections thereon are caused to beat or scutch the fiber, knocking the hurds therefrom. The teeth on the upper or lower members being intermeshed or interspaced as shown in Fig. 15, the fiber is bent in a zig-zag course in passing therethrough, both in a vertical plane, as indicated in Fig. 50, and in a horizontal plane, as indicated in Fig. 51, the fiber resting in the notches or lowest portions of the scutching bars between the teeth, this bending back and forth of the fiber in passing between the teeth insuring that it will be brought into effective contact with the teeth for the stripping, combing and cleaning operations.

The fiber passes from the scutching operation described to the softening operation performed by the rollers 65 whose corrugations 62 engage with the fiber, as shown in Fig. 49$^b$, so as to exert a frictional pressure or rubbing action thereon, the minimum distance between said corrugations being at least as small as the average thickness of the fiber. This combined bending, squeezing and rubbing action on the fiber softens the fiber as well as loosening the refuse matter that still adheres to the fiber, for example, portions of the bark, wood, etc. and renders them readily removable in the next operation. From the softening operation the fiber passes to a second scutching operation in which it is subject to a repetition of the spreading, scutching, stripping, drawing and combing operations, this second scutching operation being performed by mechanism traveling at a higher rate of speed than the first scutching mechanism and with finer teeth, so that the operation is more thorough. Such fibers as hemp when previously partially or wholly retted, or other fibers that yield more easily to decortication, are now thoroughly clean enough to require no further treatment by my machine to make them marketable, but when fiber bearing stalks, such as ramie, flax, hemp, jute, sesbania and the like, are unretted, they receive a further treatment in my process to bring them into perfect condition for carding and combing, superior to the products heretofore produced. This is effected by passing the fiber from the last scutching device into the series of rotating and longitudinally vibrating rolls 76, 78, whose knurled or roughened surfaces, by their rotation, carry the material forwardly and by their relative lateral movement or vibration, subject the material to a rubbing action which loosens the gum and bark, etc., from the fiber. All of these rubbing rolls preferably travel at a greater linear velocity than the preceding mechanisms, so as to maintain the tension of the fiber. After this rubbing operation, the fiber is then passed through the supplementary scutching means 109 which subjects it to a repetition of the scutching, stripping, drawing and combing operations, but with greater velocity and finer teeth in the operating parts, whereby the fiber is freed from waste and refuse.

It is an important feature of the present invention that the velocity of the fiber is continuously increased so as to maintain it in tense or taut condition, each of the roller mechanisms after the first one being geared to move faster than the preceding roller mechanisms, so that each mechanism tends to draw the fiber faster, and thereby maintain the tension. The scutching mechanisms may also increase in speed in order of sequence, but move faster than the roller mechanisms so as to effect the drawing, combing and stripping operations. Should a still further treatment be desired to more thoroughly separate, part and hackle the fiber, or for preparing low grade fibers for the highest grade paper pulp, then the fiber may be subsequently passed through the hackling device shown in Figs. 34 and 35.

In the above described operations on the fiber the seed is loosened and detached from the fiber and falls into the receiver 9, the conveyer or scraping means 128 operating to scrape the seed and refuse over the screen 126, the seed passing through said screen and through the sieves below the same and being delivered by the means 139. Suitable means may be provided for vibrating such screen. As such means are well known to mechanics, I have not illustrated any such means herein. The waste or refuse, such as wood, bark, etc., passes out at delivery spout 127 and may be used for fuel or for any other purpose as desired.

It is desirable in practice to tilt the machine upwardly at the rear end, as indicated by the position of the series of devices in Fig. 48, so that the effect of gravity is to tend to cause the separated waste and seeds to fall toward the front end of the machine and away from the end at which the clean fiber is passing and delivered, thus facilitating and expediting the separation of the refuse from the fiber and the delivery of the seed to the side and refuse at the front end of the machine. This inclination of the apparatus may be produced by the adjusting means indicated at 5 and 7.

It will be noted that all of the devices precedent to the softening rollers are spaced so that there is no danger of crushing the seed and the seed will fall easily between the parts and in practice all of the seed is separated from the stalks before it reaches the softening rollers, so that there is no bruising or damage of the seed or expulsion of oil therefrom.

In treating leaf fiber, the leaves should first be crushed while green and freed from the juice contained in the fleshy parts by the usual means for this purpose. The remainder is then dried and treated by my apparatus above described. Green fiber stalks of ramie and the like or green fiber bearing plants can also be cleaned by my machine, but all metal parts have to be of brass or other non-corroding material for this purpose.

Stalks on plants which have become tangled in such manner that the fiber lies in different directions and is tangled up so that it cannot be made to pass through the machine in parallelism, can be effectually treated by the above described apparatus, those fibers or stalks which extend mainly parallel to the longitudinal axis of the machine being operated on as above described and the stalks or fibers which lie transverse to this direction being broken longitudinally by the circumferentially ribbed rolls and being then split longitudinally by the operation of the longitudinal corrugated rolls. In this manner I am able to produce from plants or stalks which are in a tangled condition, such that they would be commercially worthless, a fiber which is commercially valuable.

What I claim is:—

1. In a machine for separating fibers from fiber bearing stalks, the combination of means for subjecting the stalks to a rolling pressure to crush and flatten the stalks and cause loosening of the outer portion from the inner portion thereof without breaking the inner portion, means receiving the stalk from said first named means and acting thereon to split the outer portion or skin of the stalk containing the fiber without breaking the inner portion thereof, and means receiving the stalk from said splitting means and adapted to subject the stalk to longitudinal bending action sufficient to break the inner or woody portion of the stalk longitudinally.

2. In a machine for separating fibers from stalks containing the same, the combination of smooth rollers adapted to receive the stalks between them, means for rotating said rollers to cause the stalk to pass between the rollers and to be crushed and flattened thereby, a second set of rollers having circumferential ribs adapted to engage and split and limber the stalks containing the fiber, means for rotating said second set of rollers to cause the flattened stalks to pass therebetween, and a third set of rollers adapted to receive the stalks from said second set of rollers and provided with longitudinal currugations intermeshing but sufficiently spaced apart to enable passage of the stalk between them and to bend the limbered stalks during such passage so as to break the inner or woody portion of the stalks.

3. In a machine for separating fibers from stalks, the combination with means for feeding and breaking the stalks, scutching, stripping and combing means adapted to receive the stalks from the said breaking means, and provided with stalk or fiber engaging members having V-shaped notches for receiving the fiber and projections between said notches, means for receiving the fibers from said scutching means and holding said fibers taut during the scutching operation, and means for driving the scutching means at a greater rate of speed than the movement of the stalks from the feeding and breaking means.

4. A machine for separating fibers from stalks, the combination with means for feeding and breaking the stalks, of scutching, stripping and combing means adapted to receive the stalks from the aforesaid breaking means, and comprising upper and lower flexible carriers, rotary means for supporting and operating said carriers, said carriers provided with transverse bars having V-shaped notches and projections between the notches, said notches being adapted to receive the fibers, the projections on the bars of the upper carrier being directed downwardly and the projections on the bars on the lower carrier being directed upwardly, means for receiving the fiber from said scutching means and holding the fiber taut in its movement through the scutching means, and means for driving the scutching means at a greater velocity than the movement of the fiber therethrough.

5. In a machine for separating fibers from stalks, the combination with means for feeding and breaking the stalks, of scutching, stripping and combing means adapted to receive the stalks or fiber from the aforesaid breaking means, and comprising upper and lower flexible carriers, rotary means for supporting and operating said carriers, said carriers provided with transverse bars having V-shaped notches and projections between the notches, said notches being adapted to receive the fibers, the projections on the bars of the upper carrier being directed downwardly and the projections on the bars on the lower carrier being directed upwardly, and the projections of the upper carrier bars extending below the projections on the lower carrier bars to give a sinuous path to the fiber in passing between said projections, means for receiving the fiber from said scutching means and holding the fiber taut in its movement through the scutching means, and means for driving the scutching means at a greater velocity than the movement of the fiber therethrough.

6. In a machine for separating fibers from stalks, the combination with means for feeding and breaking the stalks, of scutching, stripping and combing means adapted to receive the stalks or fiber from the aforesaid breaking means, and comprising upper and lower flexible carriers, rotary means for supporting and operating said carriers, said carriers provided with transverse bars having V-shaped notches and projections between the notches, said notches being adapted to receive the fibers, the projections on the bars of the upper carrier being directed downwardly and the projections on the bars on the lower carrier being directed upwardly, and the projections of the upper carrier bars extending below the projections on the lower carrier bars to give a sinuous path to the fiber in passing between said projections, and projections on the upper and lower carrier bars being arranged in staggered relation to give a sinuous movement to the fiber in a horizontal plane, means for receiving the fiber from said scutching means and holding the fiber taut in its movement through the scutching means, and means for driving the scutching means at a greater velocity than the movement of the fiber therethrough.

7. In a machine for separating fiber from stalks, the combination of scutching, stripping and combing means, comprising upper and lower flexible carriers, rotary supporting and operating means for said carriers whereby the adjacent runs of the carriers are moved forwardly, said flexible carriers being provided with transverse bars having V-shaped notches for receiving and engaging the fiber to strip the woody matter therefrom, breaking rollers adapted to receive the stalks and fiber and to deliver the same to the scutching, stripping and combing means, and softening rollers adapted to receive the stalks and fiber from the scutching, stripping and combing means to hold the same taut in its passage through the scutching, stripping and combing means, said breaking rollers and softening rollers moving at slower speed than the scutching, stripping and combing means.

8. In a machine for separating fibers from stalks, the combination of a plurality of scutching, stripping and combing devices, each comprising upper and lower carriers, said carriers provided with transverse bars having V-shaped notches adapted to receive the fibers, the notches in the bars of successive scutching devices being closer together and the bars of said scutching devices being adjustably supported and being arranged closer together in successive scutching means, means for supplying the stalks or fiber to the first scutching device and means for receiving the fiber from each scutching device and holding it taut in its passage through the scutching device.

9. In a machine for separating fiber from stalks, the combination of scutching, stripping and combing means, comprising upper and lower flexible carriers, supporting and operating means for said carriers whereby the adjacent runs of the carriers are moved forwardly, said carriers being provided with transverse bars having V-shaped notches for receiving and engaging the fiber to strip the woody matter therefrom, breaking rollers adapted to receive the stalks and fiber and to deliver the same to the scutching, stripping and combing means and softening rollers adapted to receive the stalks and fiber from the scutching, stripping and combing means and to hold the same taut in its passage through the scutching, stripping and combing means, and means for adjustably supporting the adjacent runs of said flexible carriers between their rotary supporting and operating means to adjust the relative position of said carriers.

10. In a machine for separating fiber from stalks, the combination of means for flattening the stalk, means for splitting the outer portion of the flattened stalk, means for breaking the inner portion of the stalk, means for scutching the fiber, a supplemental separating means comprising rolls between which the fiber passes, said rolls being roughened to frictionally engage the fiber, means for rotating said rolls, means for causing relative longitudinal movement of the rolls to subject the fiber to a rubbing action, and scutching means for receiving the fiber from said rubbing means and removing from the fiber the material loosened by said rubbing means.

11. In a machine for treatment of fiber bearing stalks or plants, the combination of a frame comprising longitudinal side bars, and a plurality of devices having frames adapted to rest on said side bars and to be longitudinally adjustable thereon, said devices provided with means for moving the fiber successively therethrough and for acting successively on the fiber, and means for clamping said devices independently and removably on said side bars, said clamping means being movable longitudinally of the said side bars and engaging externally with the side bars to clamp the said devices in any longitudinal position on said side bars.

In testimony whereof, I have hereunto set my hand at Los Angeles, California, this 6th day of July, 1910.

GEORGE WILLIAM SCHLICHTEN.

In presence of—
ARTHUR P. KNIGHT.
FRANK L. A. GRAHAM.